(12) United States Patent
Gerrish et al.

(10) Patent No.: US 6,700,654 B2
(45) Date of Patent: Mar. 2, 2004

(54) AUTOMATIC DARK CURRENT COMPENSATION

(75) Inventors: Kevin S. Gerrish, Elmira, NY (US); Scott T. Hilbert, Newfield, NY (US)

(73) Assignee: Corning Incorporated, Corning, NY (US)

( * ) Notice: Subject to any disclaimer, the term of this patent is extended or adjusted under 35 U.S.C. 154(b) by 302 days.

(21) Appl. No.: 09/784,729

(22) Filed: Feb. 15, 2001

(65) Prior Publication Data

US 2004/0008984 A1 Jan. 15, 2004

(51) Int. Cl.$^7$ ................................................ G01N 21/00
(52) U.S. Cl. ........................ 356/73.1; 398/33; 398/24; 398/213
(58) Field of Search .............................. 359/110, 153, 359/161, 187, 194; 356/73.1; 398/33, 9, 24, 195, 209, 213, 158

(56) References Cited

U.S. PATENT DOCUMENTS 5,747,791 A    5/1998   Coroy .................... 250/214 R
6,519,026 B1 *  2/2003   Holland .................... 356/73.1

FOREIGN PATENT DOCUMENTS

EP            1195927 A2    10/2002

* cited by examiner

*Primary Examiner*—Kinfe-Michael Negash
(74) *Attorney, Agent, or Firm*—Juliana Agon

(57) ABSTRACT

A monitoring system useful for monitoring the state of a fiber communication channel in which a portion of the fiber signal is tapped and detected by a photodiode. The dark current of the photodiode and other DC offsets of the system may be compensated by passing a known signal through the photodiode and extracting the component due to the known signal. The known signal may be a locally generated optical signal having a predetermined harmonic signature. Optionally, the fiber signal may be selectively attenuated before being combined with the known signal so only the known signal is detected. The known signal may also be a dark signal induced by selectively attenuating the fiber signal. The system may include a temperature sensor which allows the compensation to be performed against stored temperature dependent compensation values while the fiber signal is not attenuated.

15 Claims, 2 Drawing Sheets

AUTOMATIC DARK CURRENT COMPENSATION

FIELD OF THE INVENTION

The invention relates generally to optical detectors. In particular, the invention relates to optical detection systems used in digital optical communication systems.

BACKGROUND ART

Communication networks, particularly those extending over long distances, are increasingly being implemented in optical fiber. At the transmitting end, a digital signal is impressed upon a laser light source typically outputting an optical signal in the 1.3 or 1.7 $\mu$m wavelength band. The optical fiber, for example, a single-mode silica fiber waveguide, carries the digitally modulated optical carrier over long distances with little distortion. At the receiving end, an optical detector such as a photodiode receives the optical signal and outputs an electrical signal corresponding to data signal impressed on the transmitting end. Data rates are limited primarily by the electronics at either end. Data rates of 40 gigabits per second (Gbs) are possible with a single optical carrier although some fielded systems operate at no more than about 50 or 100 megabits per second (Mbs).

Although the optical loss in the optical fiber is relatively low, allowing transmission over tens to even hundreds of kilometers, eventually the signal attenuates to the point that it requires some sort of amplification. Amplification is also required because optical signals are sometimes split between multiple paths or the amplitude of the optical signal needs to be increased for detection or other purposes. One possible type of amplifier is a regenerator which detects the optical signal and uses the resultant electrical signal to control an optical transmitter which brings the optical signal back to an unattenuated level. However, in a more convenient and typically less expensive approach, an optical amplifier amplifies the optical carrier signal including any data modulation impressed upon it. Optical amplifiers are particularly advantageous in wavelength-division multiplexed systems in which a single fiber carries multiple optical carrier signals of slightly different respective wavelengths modulated with multiple respective data signals. A single well designed optical amplifier can amplify all of the wavelength channels while a separate regenerator needs to be provided for each wavelength channel.

The most prevalent optical amplifier is an erbium-doped fiber amplifier (EDFA), which has a fairly flat gain bandwidth of about 40 nm, which is sufficient for many WDM networks. However, optical amplifiers tend to be sensitive to variations in the average power levels on the fiber and to noise spikes. For these reasons, a robust network often includes a monitoring system located at an optical amplifier that determines the average power level and other physical parameters of the optical signals. Such a monitor taps a small amount of optical power from the signal on the cable and measures its intensity at a sampling rate of typically kilohertz to megahertz, far below the gigahertz rate of data signals.

Typically, the light is detected by a photodiode included in the monitoring system. However, photodiodes present some difficulties in measuring optical intensity to the significant resolution desired for the monitoring system. A photodiode is a light-sensitive electrical device, specifically a semiconductor diode which is negatively biased so that the photodiode passes very little current in the absence of light. The current in the absence of light is called the dark current. However, when the reversed biased photodiode is irradiated with light, such as that received from the optical fiber, the light generates electron-hole pairs, which are detected by the electronic circuitry as a current signal. In the presence of light, the signal includes both the photocurrent resulting from the incident light and dark current, of which the dark current is independent of the data signal. Because the photocurrent is being used to monitor the fiber and its value is not fixed, the dark current represents noise signal detracting from the accuracy of the measurement even though the noise signal varies only slowly with time.

Often the dark current can be reduced by the use of better components. However, better components may be excessively expensive, or the system performance is pushed even further so that dark current again becomes a problem. An alternative approach attempts to compensate for dark current and other similar sources of noise by determining their magnitudes and removing their contributions from the measured signal. Of course, in a commercial system, compensation must be accomplished without unduly complicating the system or excessively increasing its cost. Accurate power measurements when the dark current is of the same order of magnitude as the photocurrent requires compensation for the dark current. The typical tradeoffs are usually between the magnitude of the dark current, sensitivity of the photodiode, and the overall speed of the circuit.

Dark current is known to strongly depend upon the temperature of the photodiode. For this and other reasons, the photodiode is usually maintained at a fairly constant temperature. But temperature can be controlled only to a limited degree in a fielded commercial environment, and some temperature variations must be accepted. Furthermore, the photodiode is subject to some uncontrollable aging effects which may affect the dark current. Particularly the temperature variations limit the sensitivity of the system.

For these reasons, it is desirable to provide dynamic means for compensating the dark current of a photodiode, that is, to periodically, over periods of minutes to hours, readjust the detection circuitry to account for the change in dark current.

SUMMARY OF THE INVENTION

A system and associated method determine the effect of photodiode dark current or other DC offsets in a monitoring system associated with an optical communication channel which uses a photodiode detecting a signal tapped from the channel to determine characteristics of the channel and its signal, for example, average signal power or noise spikes. A known signal is passed through the photodiode, and its detected value is extracted to allow the photodiode or other electrical circuitry to be characterized.

The known signal may be a locally generated repetitive signal with a known harmonic signature or characteristic and is combined with the tapped signal. Signal processing including harmonic analysis allows the detected signal to be separated into the channel component and the component arising from the known signal.

Optionally, the tapped signal may be selectively attenuated so that during the attenuation period mostly the known signal is being detected.

Alternatively, the tapped signal is nearly completely attenuated during a system characterization period so that the known signal corresponds to a dark signal being received. No locally generated harmonic signal is required.

Advantageously, the system includes a temperature sensor and storage means for storing system response values at a number of temperatures while the tapped signal is attenuated. When the tapped signal is not so attenuated, the temperature is measured and the one or more of the stored system response values is used to correct the system response value according to the measured temperature. The system can be calibrated while the tapped signal is attenuated by controllably heating the system and recording the system response associated with the temperature.

DETAILED DESCRIPTION OF THE PREFERRED EMBODIMENTS

Figure 1:
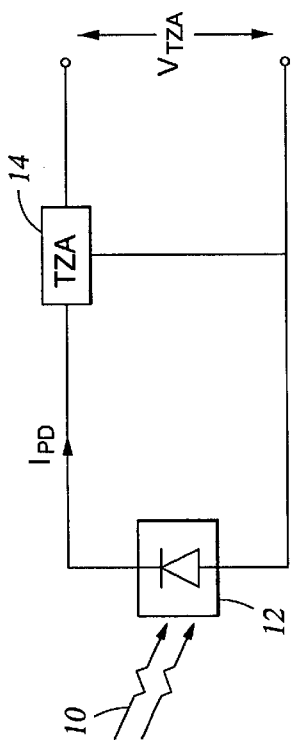
FIG. 1 is a schematic diagram of an optical detection circuit.

A typical photodetection system is illustrated in the schematic diagram of FIG. 1. Light 10 received, for example, from an optical fiber, is incident upon a photodiode 12, which produces a detector current $I_{PD}$. A transimpedance amplifier (TZA) 14 receives the detector current $I_{PD}$ and converts it to a voltage signal $V_{TZA}$, which is processed by the detection circuitry including that of the invention. The transimpedance amplifier 14 also applies a DC bias voltage to the photodiode 12 to keep it negatively biased. The detector current $I_{PD}$ includes two components $$I_{PD} = I_{photo} + I_{dark} \tag{1}$$

where $I_{photo}$ is the photocurrent induced by the light 10 incident on the photodiode 14 and $I_{dark}$ is the dark current resulting from the I-V characteristics of the biased diode 14. These two terms may in turn be respectively represented by $$I_{photo} = P_{recvd}(\omega) \frac{e}{\hbar \omega} \left( \frac{\eta_{DC} - \eta_{AC}}{\sqrt{1 + (\omega/\omega_D)^2}} + \eta_{AC} \right) \tag{2}$$

and $$I_{dark} = I_S \left( e^{\frac{eV_D}{kT}} - 1 \right) + I_{leakage} \tag{3}$$

where $P_{recvd}$ is the received optical power, $\omega$ is the radial frequency of the light, $\omega_D$ is the 3dB power point of the device dictated by the carrier diffusion frequency, e is the electronic charge, h is Planck's constant, k is Boltzmann's constant, $\eta_{DC}$ is the DC electro-optic quantum efficiency, $\omega_{AC}$ is the AC electro-optic quantum efficiency, and $V_D$ is the bias voltage applied to the photodiode.

The dark current $I_{dark}$ is always present even if no light is irradiating the photodiode. Although the dark current is substantially a DC signal, its value is uncertain and tends to vary slowing with time, for example, as the photodiode temperature changes. On the other hand, the photocurrent $I_{photo}$ in a well designed system is proportional to the intensity of the light incident on the photodiode, which is itself proportional to the received optical power $P_{recvd}$.

Figure 2:
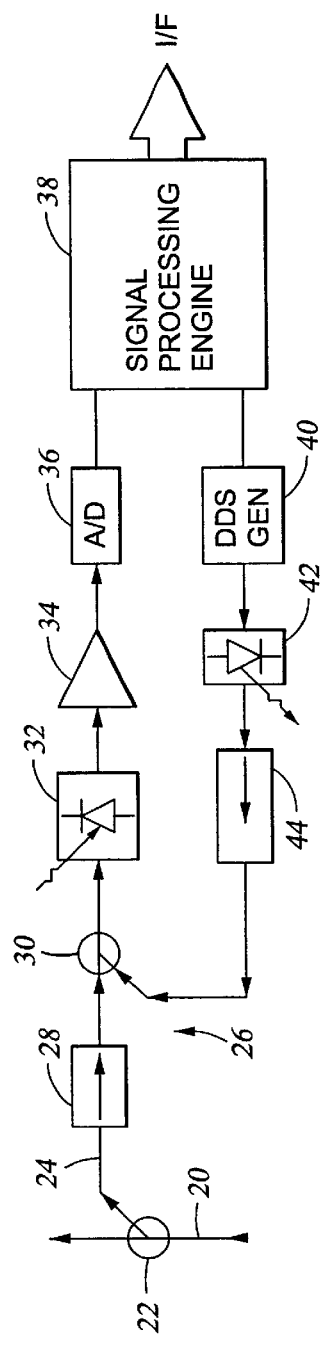
FIG. 2 is a schematic diagram of a first embodiment of a monitoring system of the invention including digitally synthesized characterizing signal enabling the extraction of photodiode dark currents.

A first embodiment of the invention illustrated in the schematic diagram of FIG. 2 extends the usable range of a photodiode by continuously measuring the dark current of the photodiode. In a typical optical communications network, digitally coded optical signal propagates on a main optical fiber 20. A tap 22 coupled to the fiber 20 taps a portion, typically a small percentage, of the optical energy onto an optical fiber 24 inputting to a monitoring system 26 of the invention. An optical isolator 28 prevents signals from the monitoring system 26 from propagating back onto the main fiber 20 and thereby introducing perturbations on the propagating signal. An optical coupler 30 combines the optical signal input into the receiver with an internally generated local characterizing signal. A photodiode 32 converts the combined optical signal to an electrical current. A transimpedance amplifier 34 both amplifies the electrical signal and converts the current signal to an analog voltage signal. An A/D converter 36 samples the analog electrical signal output from the amplifier 34 and converts it to a multi-bit digital signal, the value of which represents an amplitude of the detected optical signal. The number of bits in the digital signal determines the dynamic range of the monitoring system 26. The photodiode 32, transimpedance amplifier 34, and A/D converter 36 are all part of a conventional monitoring system. The sampling rate of the A/D converter 36 is substantially lower than the data rate on the fiber 20, for example, by a factor of at least 100 and preferably at least 1000, so that the data signal is lost upon A/D conversion if not before.

A signal processing engine 38 receives the digitized signal from the A/D converter 36. The signal processing engine 38 is typically a microprocessor-based system conventionally used to perform measurements of the tapped optical signal, as well as to control the timing of the measurements and sequencing of the measurement devices. Its output is supplied to an interface to a system controller at the communications node. The system controller uses the information provided by the monitoring system to adjust the operation of the communication node, to communicate system performance to other parts of the communications network, and to notify the need for maintenance if necessary.

According to the invention, the capabilities of the signal processing engine 38 are expanded. It controls a direct digital synthesis (DDS) generator 40 that generates a continuous, repetitive train of a predetermined sequence of digital signals. This sequence is chosen to have an easily recognizable harmonic signature. In particular, the DDS signal has a controlled amplitude and frequency so that it acts as a known reference. The harmonic signature of the DDS signal should be unique and not be a signature that would occur during normal operation of the monitoring system. The output of the DDS generator 40 modulates a laser or light-emitting diode 42 emitting in the optical band to which the photodiode detector 32 is sensitive. The optical signal emitted by the laser 42, which is the aforementioned local characterizing signal, passes through another optical isolator 44 before the optical coupler 30 combines local characterizing signal with the communication signal received from the main fiber 20.

The signal processing engine 38 receives both the communication signal and the locally generated characterizing signal with its known harmonic signature. It establishes which part of signal is the local characterizing signal arising from the DDS based upon the known harmonic signature. For example, it may use a fast Fourier transform (FFT) to extract the reference frequency and amplitude. The signal processing engine 38 may use the extracted information to calculate a signal-to-noise ratio from which the dark current magnitude may be determined. The signal processing engine 38 may then remove the dark current component from the detected signal to determine the monitoring signal tapped from the fiber. Because the known local characterizing signal has been detected by the photodiode 32 having the uncertain dark current, the measurement of the detected local characterizing signal allows the dark current of the photodiode to be determined.

The local characterizing signal generated by the DDS generator has an easily recognizable harmonic signature and may be as simple as an alternating binary signal, that is, a square wave. Preferably, the data rate for the DDS signal is significantly lower than that of the data signal being carried on the fiber, for example, by a factor of 100, so that the local characterization signal is easily separated from the data signal.

The system of FIG. 2, however, has the disadvantage that it cannot distinguish the photodiode dark current from a DC optical signal propagating on the main fiber 20, that is, an unmodulated optical signal at the carrier frequency. The photodiode converts a DC optical signal to a DC voltage indistinguishable from a photodiode dark current.

Figure 3:
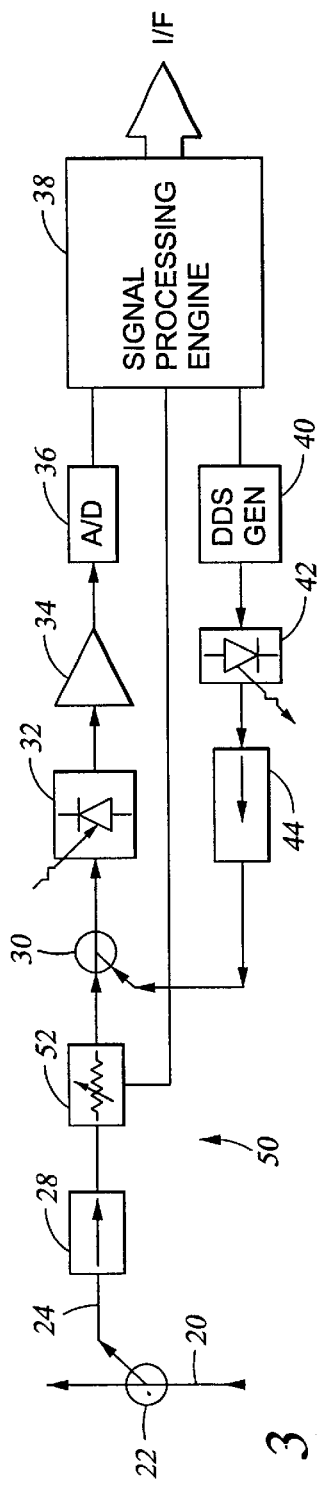
FIG. 3 is a schematic diagram of a second embodiment of the invention additionally including a controllable optical absorber.

A second embodiment illustrated in the schematic diagram of FIG. 3 allows the DC optical signal to be separated from the photodiode dark current. A monitoring system 50, otherwise similar to the monitoring system 26 of FIG. 2, additionally includes a controllable optical absorber 52 placed in the path of the received communication signal between the isolator 28 and the optical coupler 30. The signal processing engine 38 periodically sets the optical absorber 52 to completely absorb all of the optical communication signal including its DC component. Since the optical absorber 52 operates between only two states and then only infrequently, it can be implemented as a switch, for example, a fiber physically movable between a coupling and non-coupling state with another fiber. However, other forms of selective optical absorbers are available, for example, an electro-optic absorber. While the communication signal is blocked, only the local characterizing signal from the DDS generator 40 is detected, thereby allowing accurate determination of the dark current.

Figure 4:
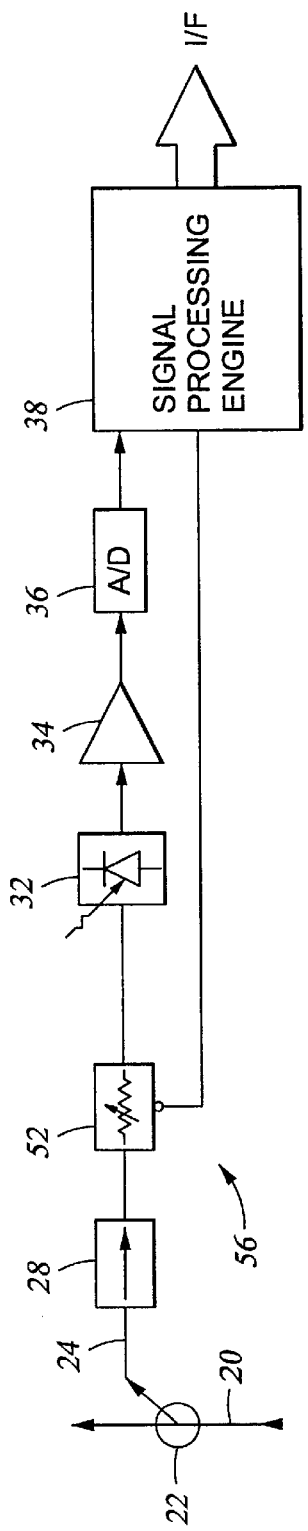
FIG. 4 is a schematic diagram of a third embodiment of the invention which is simplified from that of FIG. 3.

If the optical absorber 28 is effective at absorbing or otherwise blocking all of the light received from the main fiber 20, then the system can be substantially simplified to a measurement system 56 illustrated in the schematic diagram of FIG. 4. The simplified measurement system 56 eliminates the local characterizing signal and the associated DDS generator and laser of FIG. 3. During the period in which the optical absorber 52 blocks the communication signal as well as any optical DC signal on the fiber, the monitoring system 56 is measuring only the DC signal associated with the photodiode dark current as well as any DC offset introduced by the electronic circuitry of the measurement system 56. A sufficient number of values are sampled during the dark period to provide an accurate background level corresponding to the dark current and electronic DC offsets. Once this value has been determined, the absorber 52 is set to its transmissive state, and operation returns to normal data signal reception during which the experimentally determined background level is subtracted from all signal values that the signal processing engine 38 receives from the A/D converter 36. If the system is recalibrated every 1 to 10 seconds by measuring a new background level, any changes introduced by temperature variations will be tracked. However, recalibration every few minutes or up to an hour may be sufficient in a controlled telecommunications environment.

Figure 5:
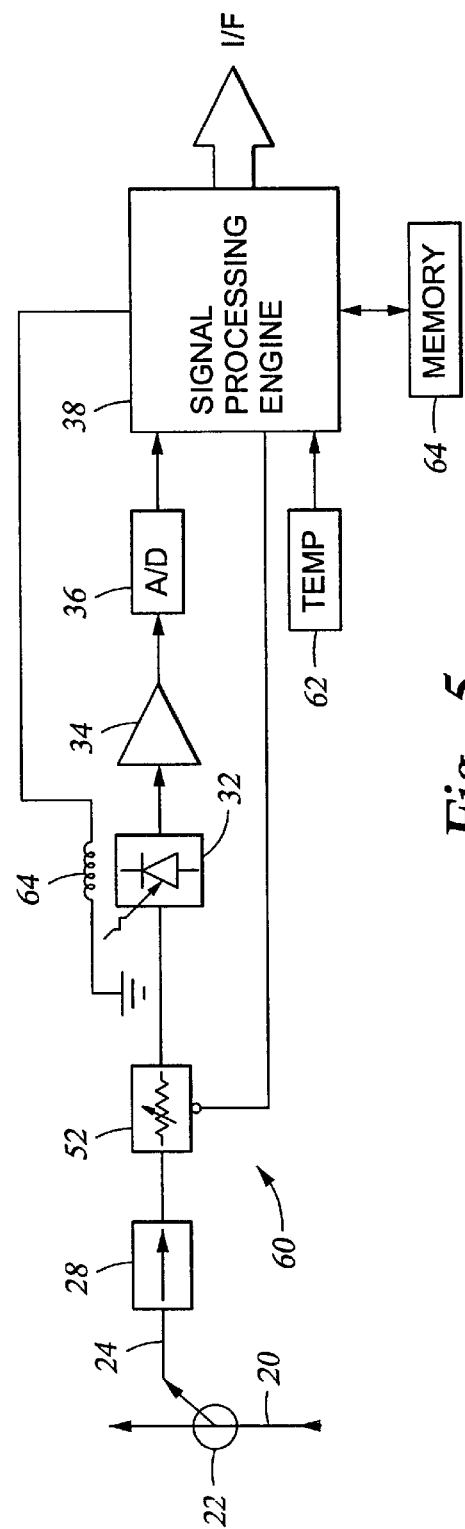
FIG. 5 is a schematic diagram of a fourth embodiment of the invention which additionally includes a temperature sensor enabling a temperature calibration of the system.

A fourth embodiment, illustrated in the schematic diagram of FIG. 5, includes a monitoring system 60 that does not require frequent interruption of the communication signal. A temperature sensor 62 measures the temperature either of the photodiode 32 only or an ambient temperature of the entire monitoring system 60 and provides that temperature to the signal processing engine 38. During a calibration period, the optical absorber 52 is set to its blocking state, and the photodiode 32 or the entire monitoring system 60 is controllably heated, for example, by a resistive heater 64 which is driven by an unillustrated power source controlled by the signal processing engine 38 and which is thermally coupled to at least the photodiode 32. If the other electronics are also heated to the same temperature, their DC offsets may also be compensated. The range of temperatures generated by the heating means need to cover the anticipated temperature range to which the system will experience during operation. During the calibration phase, the signal processing engine 38 measures the detected signal values corresponding to the dark state on the fiber and which include both the photodiode dark current and the electronic DC offsets. The signal processing engine 38 then stores in a table the measured values and the corresponding temperature sensed during the measurement. The table is stored in a memory 64, which is typically already included in the signal processing engine 38. Of course, it is possible that the table is directly indexed by temperature so that the temperature is not directly stored. Instead, the measured intensity is associated with a temperature by its location in the table.

After completion of calibration, the heater 64 is turned off, the optical absorber 52 is set to the transparent state, and the system returns to normal communication operation. During normal operation, the signal processing engine 38 monitors the temperature sensed by the temperature sensor 62 and consults the stored table in the memory 64 to determine the proper dark current and electronic DC offset for that temperature and accordingly compensates the detected signals, for example, by subtracting the stored calibration value for that temperature from the measured value during normal operation.

The calibration needs to be performed only infrequently, for example, during scheduled maintenance of the optical receiver during which the communication signal is interrupted anyway.

The technique can be extended to compensate for a number of other electro-optical devices ranging from optical amplifiers to optical channel monitors and to thereby extend their dynamic range.

Although the invention is easily implemented with a direct digital synthesis generator, alternatively a harmonic generator or some other analog method may be used to generate the reference signal.

The invention thus allows the monitoring system to achieve a higher dynamic range with the addition of relatively simple components.

What is claimed is:

1. A monitoring system receiving a first optical signal tapped from an optical communication channel, comprising:
    an optical coupler combining said first optical signal received on a first input and a second optical signal received on a second input and producing an incident combined optical signal;

a photodiode detecting said incident combined optical signal and outputting a first electrical signal;

an analog-to-digital converter receiving said first electrical signal and sampling it to produce a multi-bit second electrical signal;

an electrical signal generator producing a third electrical signal that is repetitive and has a predetermined harmonic characteristic;

a light emitting electrical device receiving said third electrical signal and outputting said second optical signal to said second input in an optical band in which said photodiode is responsive;

an isolator coupled to the first input of the optical coupler for preventing said first optical signal and said second optical signal from propagating back onto said optical communication channel; and a signal processor receiving said second electrical signal and capable of distinguishing a portion of said second electrical signal according to said predetermined harmonic characteristic, wherein said electrical signal generator is a digital electrical generator controlled by said signal processor; and a selective optical absorber having input and output sides and receiving said first optical signal on said input side, connected to said first input on said output side, and controlled by said signal processor to variably attenuate said first optical signal.

2. The monitoring system of claim 1, wherein said signal processor controls said optical absorber to selectively be in a higher attenuation state or a lower attenuation state with respect to attenuating said first optical signal, and wherein said signal processor compares said second electrical signal received when said optical absorber is in said lower attenuation state to said second electrical signal received when said optical absorber is in said higher attenuation state.

3. A monitoring system receiving a first optical signal tapped from an optical communication channel, comprising:

a signal processor;

a selective optical absorber receiving said first optical signal on an input side, providing a variably attenuated first optical signal on an output side, and controlled by said signal processor to variably attenuate said first optical signal;

a photodiode receiving said variably attenuated first optical signal from said output side and producing a first electrical signal in response thereto; and an analog-to-digital converter receiving said first electrical signal and sampling it to produce a multi-bit second electrical signal, which is received by said signal processor.

4. The monitoring system of claim 3, wherein said signal processor compares a first value of said second electrical signal detected when said optical absorber is in a state of high attenuation of said first optical signal from a second value of said second electrical signal detected when said optical absorber is in a state of low attenuation of said first optical signal.

5. The monitoring system of claim 3, further comprising:

a temperature sensor providing a measured temperature associated with said photodiode to said signal processor; and a heater controllably heating said photodiode under control of said signal processor; and a memory associated with said signal processor for storing a table of values of third electrical signals and associated ones of said measured temperature.

6. The monitoring system of claim 5, wherein said signal processor derives said third electrical signals from said second electrical signals when said optical absorber is in said state of high attenuation.

7. The monitoring system of claim 6, wherein, while said optical absorber is in a state of low attenuation, said signal processor subtracts from said second electrical signal a value derived from one of said third electrical signals corresponding to a temperature then measured by said temperature sensor.

8. A method of monitoring an optical communications channel, comprising the steps of:

tapping a fraction of a signal propagating along said optical communications channel to form a first optical signal;

generating a second optical signal with a predetermined harmonic characteristic;

combining said first optical signal with said second optical signal to form a third optical signal;

detecting said third optical signal in a photodiode to form a first electrical signal;

sampling and digitizing said first electrical signal to form a multi-bit second electrical signal;

extracting a portion of said second electrical signal based upon said predetermined harmonic characteristic; and determining a dark current of said photodiode from said extracted portion.

9. The method of claim 8, further comprising selectively attenuating said first optical signal before it is combined with said second optical signal.

10. The method of claim 9, wherein said extracting step includes comparing said second signal when said first signal is less attenuated to said second signal when said first signal is more attenuate.

11. A method of monitoring an optical communications channel, comprising the steps of:

tapping a fraction of a signal propagating along said optical communications channel to form a first optical signal;

selectively attenuating said first optical signal according to at least a high attenuation state and a low attenuation state;

detecting said selectively attenuated first optical signal to produce a first electrical signal;

sampling and digitizing said first electrical signal to form a multi-bit second electrical signal;

adjusting values said second electrical signals received while said first optical signal is attenuated according to said low attenuation state in response to at least one value of said second electrical signal received while said first optical signal is attenuated according to said high attenuation state.

12. The method of claim 11, further comprising the steps of:

measuring a temperature of said photodiode;

controllably heating said photodiode to a plurality of temperatures; and recording signal values derived from said second optical signal received while said first optical signal is attenuated according to said high attenuation state and while said photodiode is heated to respective ones of said plurality of temperature and further associating in said table temperature values corresponding to said signal values;

wherein said adjusting step includes
measuring said temperature of said photodiode while said first optical signal is attenuated according to said low attenuation state to produce a measurement temperature value, and
adjusting said values according to at least one of said recorded signal values corresponding to said measurement temperature value.

13. A method of monitoring an optical communications channel, comprising the steps of:

tapping a fraction of a signal propagating along said optical communications channel to form a first optical signal;

passing said first optical signal through a photodiode, a first electrical signal being thereby produced;

determining a dark current produced in said photodiode while said first electrical signal is being produced; and compensating said first electrical signal for said determined dark current.

14. The method of claim 13, further comprising:

generating a second optical signal having a predetermined harmonic content; and combining said first and second optical signals;

wherein said passing step simultaneously passes said combined first and second optical signals to produce to first electrical signal; and wherein said determining step determines a level of said first electrical signal having said predetermined harmonic content.

15. The method of claim 13, further comprising measuring a temperature of said photodiode while said first electrical signal is being produced and wherein said determining step includes retrieving a data value stored in a memory corresponding said measured temperature.

* * * * *